(12) United States Patent
Lee et al.

(10) Patent No.: US 10,864,797 B2
(45) Date of Patent: Dec. 15, 2020

(54) AIR CONDITIONING APPARATUS FOR VEHICLE

(71) Applicant: Hyundai Motor Company, Seoul (KR)

(72) Inventors: Sang Shin Lee, Suwon-si (KR); Jae Woo Park, Ansan-si (KR); So Yoon Park, Suwon-si (KR); Man Ju Oh, Yongin-si (KR); Jae Woong Kim, Hwaseong-si (KR); So La Chung, Seoul (KR)

(73) Assignee: HYUNDAI MOTOR COMPANY, Seoul (KR)

( * ) Notice: Subject to any disclaimer, the term of this patent is extended or adjusted under 35 U.S.C. 154(b) by 143 days.

(21) Appl. No.: 15/587,191

(22) Filed: May 4, 2017

(65) Prior Publication Data
US 2018/0141407 A1 May 24, 2018

(30) Foreign Application Priority Data

Nov. 23, 2016 (KR) .................... 10-2016-0156505

(51) Int. Cl.
*B60H 1/00* (2006.01)
(52) U.S. Cl.
CPC .............. *B60H 1/00678* (2013.01); *B60H 2001/00721* (2013.01)
(58) Field of Classification Search
CPC ........... B60H 1/00671; B60H 1/00678; B60H 1/00835
See application file for complete search history.

(56) References Cited

U.S. PATENT DOCUMENTS

| 2,281,530 | A | * | 4/1942 | Strawn ................ B03B 5/24 209/455 |
| 4,160,440 | A | * | 7/1979 | Barnickle ............. F24H 9/2085 126/110 R |
| 4,947,735 | A | * | 8/1990 | Guillemin .................... 454/141 |
| 5,476,418 | A | * | 12/1995 | Loup ............................ 454/121 |
| 5,850,741 | A | | 12/1998 | Feher |
| 6,520,850 | B1 | * | 2/2003 | Buckman ...................... 454/121 |
| 7,775,451 | B2 | * | 8/2010 | Leoni ............................ 236/49.5 |
| 8,544,533 | B2 | * | 10/2013 | Lee ................................ 165/202 |
| 2003/0045224 | A1 | * | 3/2003 | Vincent ........................ 454/156 |
| 2003/0201096 | A1 | * | 10/2003 | Perry ............................ 165/202 |

(Continued)

FOREIGN PATENT DOCUMENTS

EP 0865945 * 9/1998
JP 2004210267 A 7/2004

(Continued)

*Primary Examiner* — Avinash A Savani
*Assistant Examiner* — Martha M Becton
(74) *Attorney, Agent, or Firm* — Slater Matsil, LLP

(57) ABSTRACT

Disclosed is an air conditioning apparatus for a vehicle, the air conditioning apparatus including: an air conditioning duct forming a passage for conditioned air, and provided with an outlet on a wall surface thereof for directing conditioned air. A door is provided inside the air conditioning duct, with a rotation shaft being provided on a wall surface opposite to the wall surface of the air conditioning duct. The door opens and closes the air conditioning duct by a rotation thereof. A partition wall protrudes from a surface of the door along the wall surface of the air conditioning duct. The partition wall opens and closes the outlet in response to the rotation of the door.

15 Claims, 3 Drawing Sheets

(56) References Cited

U.S. PATENT DOCUMENTS

| | | | |
|---|---|---|---|
| 2004/0168540 A1 | 9/2004 | Weiss | |
| 2005/0118944 A1* | 6/2005 | Vincent | 454/121 |
| 2005/0233687 A1* | 10/2005 | Wachter | 454/152 |
| 2008/0200110 A1* | 8/2008 | Ghosh | 454/160 |
| 2012/0295529 A1* | 11/2012 | Fukutomi | 454/152 |
| 2015/0217629 A1* | 8/2015 | Kawanishi | 454/152 |

FOREIGN PATENT DOCUMENTS

| | | | |
|---|---|---|---|
| JP | 2008308123 A | 12/2008 | |
| JP | 2015105071 A | 6/2015 | |
| KR | 1019980003245 A | 3/1998 | |
| KR | 2020090008039 U | 8/2009 | |
| KR | 20130065096 A | 6/2013 | |

* cited by examiner

AIR CONDITIONING APPARATUS FOR VEHICLE

CROSS-REFERENCE TO RELATED APPLICATIONS

The present application claims priority to Korean Patent Application No. 10-2016-0156505, filed Nov. 23, 2016, the entire contents of which is incorporated herein for all purposes by this reference.

TECHNICAL FIELD

The present invention relates to an air conditioning apparatus for a vehicle.

BACKGROUND

Recently, vehicles have come to realize multiple functions beyond just being a means of transportation. Development objectives have also changed as follows. Conventionally, research focused on developing a speedy and powerful engine, but recently research has been actively being conducted to provide a comfortable and pleasant transportation environment, since vehicles have become a second living space for many.

As part of the above research, there is an air conditioning apparatus for conditioning air in the passenger compartment. The air conditioning apparatus firstly filters air flowing in from the outside, and controls the temperature and humidity of the air and provides the air to the passenger compartment, thereby creating a pleasant environment.

The conditioned air supplied through the air conditioning apparatus is used not only to control the air in the passenger compartment but also to realize various convenience functions, such as a refrigerator air or a cooling seat using air from the conditioning apparatus.

In order to realize these convenience functions, a duct for separately supplying the air supplied from the air conditioning apparatus to needed places is required, but to provide the duct to a conventional air conditioning apparatus, many changes in design may be required, or a layout structure inside the vehicle may be complex.

The foregoing is intended merely to aid in the understanding of the background of the present invention, and is not intended to mean that the present invention falls within the purview of the related art that is already known to those skilled in the art.

SUMMARY

Accordingly, the present invention has been made keeping in mind the above problems occurring in the related art, and the present invention is intended to propose an air conditioning apparatus for a vehicle, the apparatus capable of branching a passage for conditioned air without being provided with an additional duct in the air conditioning apparatus, and capable of controlling supply of the conditioned air to the branched passages.

In order to achieve the above object, according to one aspect of the present invention, there is provided an air conditioning apparatus for a vehicle, the air conditioning apparatus including: an air conditioning duct forming a passage for conditioned air, and provided with an outlet on a wall surface thereof for directing conditioned air; a door provided inside the air conditioning duct, with a rotation shaft being provided on a wall surface opposite to the wall surface of the air conditioning duct, the door opening and closing the air conditioning duct by a rotation thereof; and a partition wall protruding from a surface of the door along the wall surface of the air conditioning duct, and opening and closing the outlet in response to the rotation of the door.

An entire length of the door may be longer than a diameter of the air conditioning duct, and the air conditioning duct may be provided with a protruding portion along a radius of rotation of the door, so as not to interfere with the door when the door is rotated.

The outlet may be provided within a closed curve formed by the rotation shaft of the door and the protruding portion.

The partition wall may be disposed downstream of an air flow in the air conditioning duct, and may be disposed on the door at a location opposite to the outlet, based on the rotation shaft.

The air conditioning apparatus for a vehicle may further include: a controller for controlling a rotational motion of the door, wherein the controller is configured to control the door to close the air conditioning duct in such a way that the controller controls an outlet-side door to be disposed downstream of the air flow further than the outlet, so the outlet is opened and the conditioned air is directed through the outlet.

The controller may control the door to close the air conditioning duct in such a way that the controller controls the outlet-side door to be disposed upstream of the air flow further than the outlet, so the outlet is closed and the air flow in the air conditioning duct is blocked.

The controller may rotationally control the door to open the air conditioning duct in such a way that the partition wall avoids closing the outlet.

The controller may rotationally control the door to open the air conditioning duct in such a way that the partition wall closes the outlet.

According to the air conditioning apparatus for a vehicle of the present invention configured as described above, it is possible to direct a part of the conditioned air without requiring an additional duct in the air conditioning apparatus, and is possible to supply or block the conditioned air to the air conditioning duct and a bypass passage, respectively, without an additional control means, such as a door.

BRIEF DESCRIPTION OF THE DRAWINGS

The above and other objects, features and other advantages of the present invention will be more clearly understood from the following detailed description when taken in conjunction with the accompanying drawings, in which.

DETAILED DESCRIPTION OF ILLUSTRATIVE EMBODIMENTS

Figure 1:
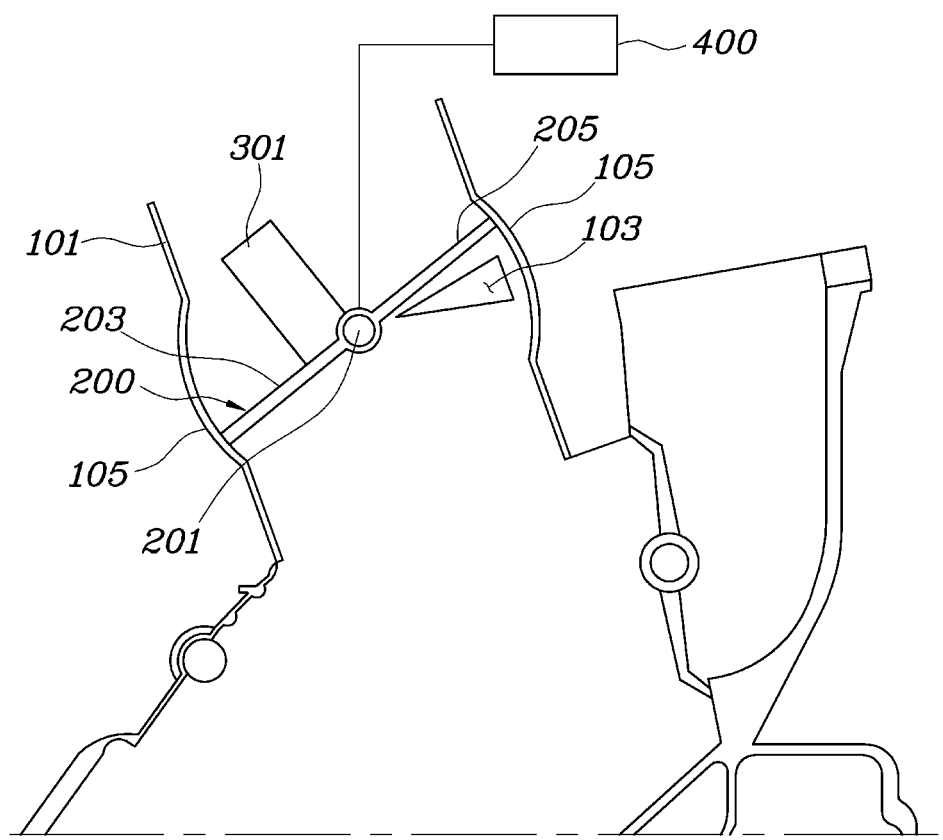
FIG. 1 is a view showing an air conditioning apparatus for a vehicle according to an embodiment of the present invention.

Hereinbelow, exemplary embodiments of the present invention will be described in detail with reference to the accompanying drawings. Throughout the drawings, the same reference numerals will refer to the same or like pails.

Embodiments of the present invention relate to an air conditioning apparatus for a vehicle, the apparatus capable of branching a passage for conditioned air without being provided a structural change, and capable of controlling supply of the conditioned air to the branched passages by controlling a door.

FIG. 1 is a view showing an air conditioning apparatus for a vehicle according to an embodiment of the present invention; and FIGS. 2 to 5 are views showing an operation mode of the air conditioning apparatus for a vehicle according to the embodiment of the present invention.

An air conditioning apparatus for a vehicle according to an embodiment of the present invention includes: an air conditioning duct 101 forming a passage for conditioned air, and provided with an outlet 103 on a wall surface thereof for directing conditioned air; a door 200 provided inside the air conditioning duct 101, with a rotation shaft 201 provided on a wall surface opposite to the wall surface of the air conditioning duct 101, the door opening and closing the air conditioning duct 101 by a rotation thereof; and a partition wall 301 protruding from a surface of the door 200 along the wall surface of the air conditioning duct 101, and opening and closing the outlet 103 in response to the rotation of the door 200.

The outlet 103, the door 200, and the partition wall 301 provided in the air conditioning duct 101 can be used in a conventional air conditioning apparatus without changing a structure thereof, and may be provided at various locations, such as a vent, a floor, a DEF duct, etc. disposed right before the conditioned air is supplied to the vehicle interior, when necessary.

Heated air or cooled air produced by the air conditioning apparatus passes through the air conditioning duct 101, and the wall surface of the air conditioning duct 101 is provided with the outlet 103 for discharging the conditioned air by being directed. Whether the conditioned air is directed through the outlet 103 is determined by whether the partition wall 301 on the door 200 closes or opens the outlet 103, and the partition wall 301 is operated in response to the rotation of the door 200.

An entire length of the door 200 may be longer than a diameter of the air conditioning duct 101; and the air conditioning duct 101 may be provided with a protruding portion 105 along a radius of rotation of the door 200, so as not to interfere with the door 200 when the door 200 is rotated.

The reason why the air conditioning duct 101 is provided with the protruding portion 105 is that the air conditioning duct 101 can be closed even when the door 200 is diagonally inclined relative to the passage for conditioned air, which is for individually controlling air supply through the outlet 103 and air supply to the air conditioning duct 101.

Figure 2:
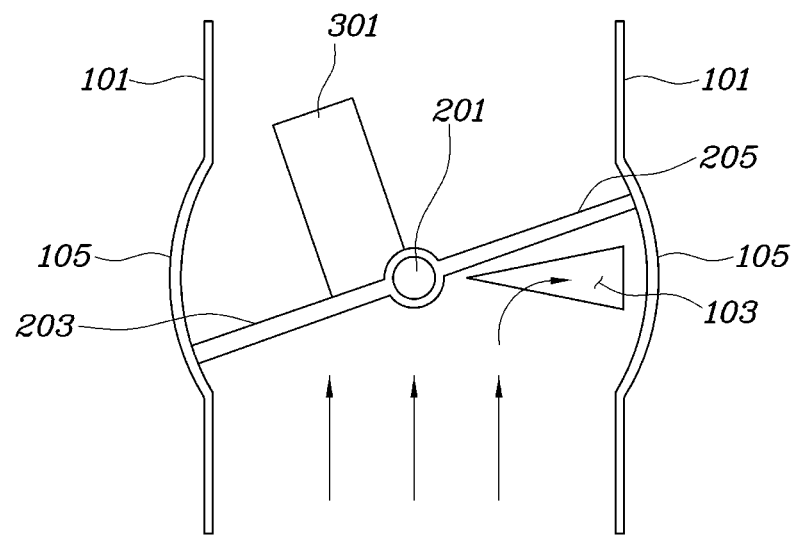
FIGS. 2 to 5 are views showing an operation mode of the air conditioning apparatus for a vehicle according to the embodiment of the present invention.
Figure 3:
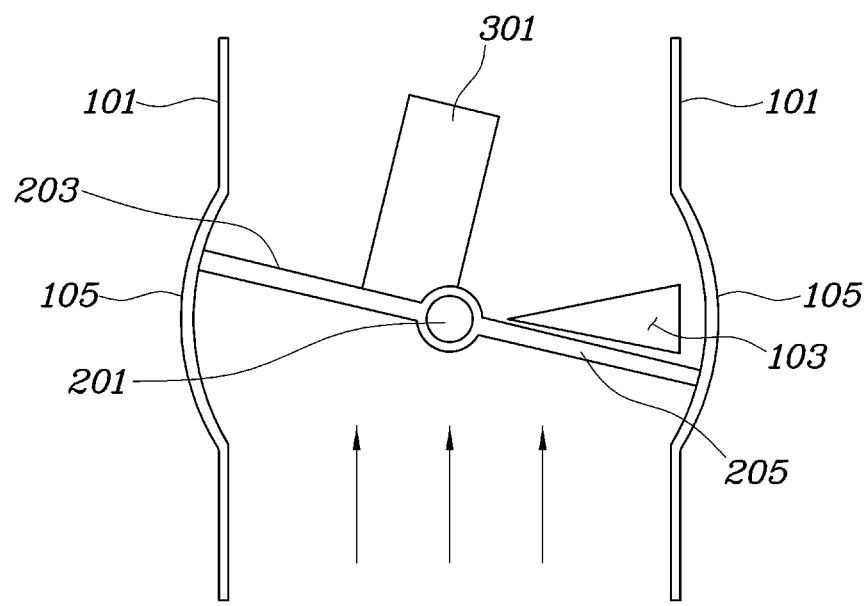

Firstly, referring to FIGS. 2 to 3, in FIG. 2, the door 200 closes the air conditioning duct 101, so the air does not pass through the air conditioning duct 101, but the outlet 103 is opened, so the conditioned air can be directed through the outlet 103. In FIG. 3, the door 200 closes the air conditioning duct 101, so the air does not pass through the air conditioning duct 101, and the outlet 103 is closed by the door 200, so the conditioned air cannot be directed through the outlet 103.

If the air conditioning duct 101 is formed in a straight line without being provided with the protruding portion 105 and the diameter of the air conditioning duct 101 is the same as the entire length 203 and 205 of the door, one of the modes in FIGS. 2 and 3 can be realized. In other words, regardless of whether the outlet-side door 205 is disposed upstream or downstream based on the outlet 103, the air conditioning duct 101 should be closed. Thus, in an embodiment of the present invention, the protruding portion 105 of the air conditioning duct 101 is required.

The outlet 103 may be provided within a closed curve formed by the rotation shaft 201 of the door 200 and the protruding portion 105. The partition wall 301 may be disposed downstream of an air flow in the air conditioning duct 101, and may be disposed on an outlet opposite door 203 opposite to the outlet 103, based on the rotation shaft 201.

Since the outlet 103 is provided within the closed curve formed by the rotation shaft 201 of the door 200 and the protruding portion 105, it is possible to close the air conditioning duct 101 regardless of whether the outlet-side door 205 is disposed upstream or downstream based on the outlet 103.

Further, since the partition wall 301 is disposed downstream of the air flow in the air conditioning duct 101 and is disposed on the outlet opposite door 203 opposite to the outlet 103, based on the rotation shaft 201, it is possible to close or open the outlet 103 in response to the rotation of the door 200.

The air conditioning apparatus for a vehicle may further include a controller 400 for controlling a rotational motion of the door 200, wherein, the controller 400 controls the door 200 to close the air conditioning duct 101 in such a way that the controller 400 controls an outlet-side door 205 to be disposed downstream of the air flow further than the outlet 103, so the outlet 103 is opened and the conditioned air is directed through the outlet 103.

The conditioned air supplied by directing through the outlet 103 is used for various convenience devices, such as seats, a steering wheel, or a cup holder, rather than for conditioning the air in the passenger compartment. Accordingly, conditioned air to be supplied to these convenience devices should be supplied apart from the air conditioning apparatus. In other words, when the air is supplied through the air conditioning apparatus, the conditioned air should be supplied to the convenience devices or should be blocked, and when the air is not supplied through the air conditioning apparatus, the conditioned air should be supplied to the convenience devices or should be blocked.

Referring to FIG. 2, the door 200 is disposed to close the air conditioning duct 101 in such a way that the outlet-side door 205 is disposed downstream of the air flow further than the outlet 103, whereby the conditioned air cannot be supplied through the air conditioning duct 101, but the conditioned air can be supplied through the opened outlet 103.

The controller 400 may control the door 200 to close the air conditioning duct 101 in such a way that the controller 400 controls the outlet-side door 205 to be disposed upstream of the air flow further than the outlet 103, so the outlet 103 is closed and the air flow in the air conditioning duct 101 is blocked.

Referring to FIG. 3, the door 200 is disposed to close the air conditioning duct 101 in such a way that the outlet-side door 205 is disposed upstream of the air flow further than the outlet 103, whereby the conditioned air cannot be supplied through the air conditioning duct 101, nor through the outlet 103.

The controller 400 may rotationally control the door 200 to open the air conditioning duct 101 in such a way that the partition wall 301 avoids closing the outlet 103.

Figure 4:
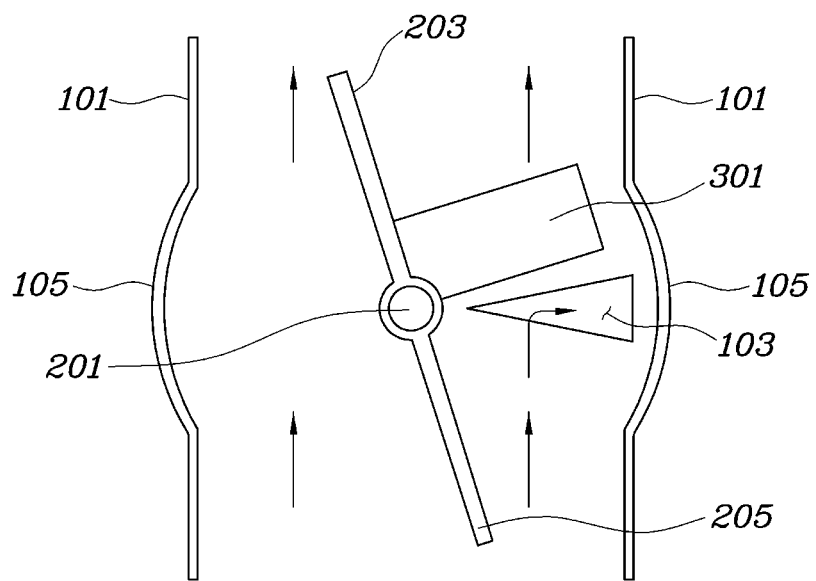

Referring to FIG. 4, the door 200 is disposed to open the air conditioning duct 101 in such a way that the partition wall 301 avoids closing the outlet 103, whereby it is possible to supply the conditioned air through both the air conditioning duct 101 and the outlet 103.

The controller 400 may rotationally control the door 200 to open the air conditioning duct 101 in such a way that the partition wall 301 closes the outlet 103.

Figure 5:
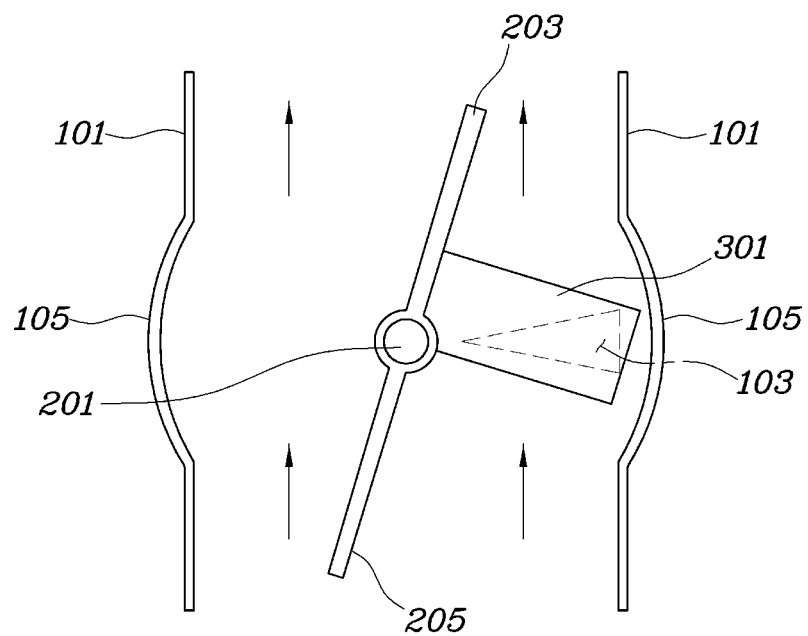

Referring to FIG. 5, the door 200 is disposed to open the air conditioning duct 101 in such a way that the partition wall 301 closes the outlet 103, whereby the conditioned air can be supplied through the air conditioning duct 101, but the conditioned air cannot be supplied through the opened outlet 103.

Although a preferred embodiment of the present invention has been described for illustrative purposes, those skilled in the art will appreciate that various modifications, additions and substitutions are possible, without departing from the scope and spirit of the invention as disclosed in the accompanying claims.

What is claimed is:

1. An air conditioning apparatus for a vehicle, the air conditioning apparatus comprising:
   an air conditioning duct forming a passage for conditioned air, and provided with an outlet on a wall surface thereof for directing conditioned air;
   a door provided inside the air conditioning duct, with a rotation shaft being provided on a wall surface of the air conditioning duct, the door configured to open and close the air conditioning duct by a rotation about the rotation shaft; and
   a partition wall protruding perpendicularly from a surface of the door, the partition wall configured to open and close the outlet in response to the rotation of the door,
   wherein a pair of protrusions expand outwardly from both sides of the wall surface forming a circular arc portion in the air conditioning duct having a diameter greater than a diameter of the air conditioning duct upstream and downstream of the circular arc portion,
   wherein the rotation shaft of the door is positioned at a center of the circular arc portion,
   wherein an entire length of the door is shorter than a diameter of the circular arc portion and longer than a diameter of the air conditioning duct upstream and downstream of the circular arc portion, and
   wherein the outlet is positioned radially within the circular arc portion between the rotation shaft and one of the pair of protrusions.

2. The air conditioning apparatus of claim 1, wherein the partition wall is disposed downstream of an air flow in the air conditioning duct, and is disposed on the door at a location opposite to the outlet, based on the rotation shaft.

3. The air conditioning apparatus of claim 1, further comprising:
   a controller for controlling a rotational motion of the door, wherein the door has an outlet-side door at a side of the outlet and an outlet-opposite door opposite to the outlet-side door, wherein, the controller is configured to control the door to close the air conditioning duct in such a way that the controller controls the outlet-side door to be disposed downstream of an air flow further than the outlet, so the outlet is opened and the conditioned air is directed through the outlet.

4. The air conditioning apparatus of claim 3, wherein the controller controls the door to close the air conditioning duct in such a way that the controller controls the outlet-side door to be disposed upstream of the air flow further than the outlet, so the outlet is closed and the air flow in the air conditioning duct is blocked.

5. The air conditioning apparatus of claim 3, wherein the controller rotationally controls the door to open the air conditioning duct in such a way that the partition wall avoids closing the outlet.

6. The air conditioning apparatus of claim 3, wherein the controller rotationally controls the door to open the air conditioning duct in such a way that the partition wall closes the outlet.

7. A vehicle with an air conditioning apparatus, the air conditioning apparatus comprising:
   an air conditioning duct comprising a passage for conditioned air;
   an outlet on a wall surface of the air conditioning duct for directing a portion of the conditioned air;
   a door disposed in the air conditioning duct, the door comprising a rotation shaft attached to a wall surface of the air conditioning duct, the door being configured to open and close the air conditioning duct by a rotation about the rotation shaft; and
   a partition wall attached to the door and protruding perpendicularly from a surface of the door, the partition wall configured to open and close the outlet in response to the rotation of the door, wherein a pair of protrusions expand outwardly from both sides of the wall surface forming a circular arc portion in the air conditioning duct having a diameter greater than a diameter of the air conditioning duct upstream and downstream of the circular arc portion,
   wherein the rotation shaft of the door is positioned at a center of the circular arc portion,
   wherein an entire length of the door is shorter than a diameter of the circular arc portion and longer than a diameter of the air conditioning duct upstream and downstream of the circular arc portion, and
   wherein the outlet is positioned radially within the circular arc portion between the rotation shaft and one of the pair of protrusions.

8. The vehicle of claim 7, wherein the partition wall is disposed downstream of an air flow in the air conditioning duct, and is disposed on the door at a location opposite to the outlet, based on the rotation shaft.

9. The vehicle of claim 7, wherein the air conditioning apparatus is configured to operate in a first mode, a second mode, a third mode, and a fourth mode, wherein a flow of the conditioned air is different between the first, the second, the third, and fourth modes.

10. The vehicle of claim 9, wherein in the first mode, the door blocks a flow of conditioned air through the air conditioning duct, wherein in the second mode, the door blocks a flow of conditioned air through the air conditioning duct and the outlet, wherein in the third mode, the door allows a flow of conditioned air through the air conditioning duct and the outlet, and wherein in the fourth mode, the door allows a flow of conditioned air through the air conditioning duct and the partition wall blocks a flow of conditioned air through the outlet.

11. The vehicle of claim 10, wherein the air conditioning apparatus further comprises:
   a controller for controlling a rotational motion of the door so as to operate the air conditioning apparatus in the first mode, the second mode, the third mode, and the fourth mode.

12. A method of operating an air conditioning apparatus in a vehicle, the method comprising:
   using a rotating door and a partition wall attached perpendicularly to the rotating door, operating the air conditioning apparatus in a first mode, a second mode, a third mode, and a fourth mode by opening and closing an air conditioning duct for passage of conditioned air and an outlet in the air conditioning duct, wherein in the first mode, the door blocks a flow of conditioned air through the air conditioning duct, wherein in the second mode, the door blocks the flow of conditioned air through the air conditioning duct and the outlet, wherein in the third mode, the door allows the flow of conditioned air through the air conditioning duct and the outlet, and wherein in the fourth mode, the door allows the flow of conditioned air through the air conditioning duct and the partition wall blocks the flow of conditioned air through the outlet, wherein a pair of protrusions expand outwardly from both sides of a wall surface forming a circular arc portion in the air conditioning duct having a diameter greater than a diameter of the air conditioning duct upstream and downstream of the circular arc portion; and rotating a rotation shaft on the door to open and close the air conditioning duct, wherein the rotation shaft of the door is positioned at a center of the circular arc portion, wherein an entire length of the door is shorter than a diameter of the circular arc portion and longer than a diameter of the air conditioning duct upstream and downstream of the circular arc portion, and wherein the outlet is positioned radially within the circular arc portion between the rotation shaft and one of the pair of protrusions.

13. The method of claim 12, further comprising:

directing all of the conditioned air through the outlet in the first mode; and directing a portion of the conditioned air through the outlet in the third mode.

14. The method of claim 12, further comprising:

opening and closing the outlet using the partition wall in response to a rotation of the door.

15. The method of claim 12, further comprising:

using a controller, controlling a rotational motion of the door so as to operate the air conditioning apparatus in the first mode, the second mode, the third mode, and the fourth mode.

* * * * *